United States Patent [19]

Steffes

[11] Patent Number: 4,840,435
[45] Date of Patent: Jun. 20, 1989

[54] HYDRAULIC BRAKE SYSTEM FOR AUTOMOTIVE VEHICLES WITH ANTI-SKID CONTROL SYSTEM

[75] Inventor: Helmut Steffes, Hattersheim, Fed. Rep. of Germany

[73] Assignee: Alfred Teves GmbH, Frankfurt am Main, Fed. Rep. of Germany

[21] Appl. No.: 252,288

[22] Filed: Sep. 30, 1988

[30] Foreign Application Priority Data

Oct. 15, 1987 [DE] Fed. Rep. of Germany ....... 3734603

[51] Int. Cl.$^4$ ............................................. B60T 8/40
[52] U.S. Cl. ..................................... 303/116; 303/114
[58] Field of Search ................. 303/92, 112, 113, 114, 303/116, 119

[56] References Cited

U.S. PATENT DOCUMENTS 4,685,749 8/1987 Otsuki et al. ...................... 303/116
4,779,935 10/1988 Kuwana et al. .................... 303/116

Primary Examiner—Duane A. Reger
Attorney, Agent, or Firm—James B. Raden

[57] ABSTRACT

A hydraulic brake system in which a hydraulic line between the master brake cylinder and the wheel brake cylinders is free from hydraulic closing means. Upstream of a non-return valve in a line connecting a hydraulic pump and said hydraulic line, there is a hydraulic communication between the outlet of the hydraulic pump and an inlet of a pressure control valve which is actuatable in dependence on the volume of the working chamber, the control valve being a storage reservoir. A hydraulic branch is also provided between the master cylinder and the wheel brake cylinders, which leads to the inlet of an electromagnetic valve; the outlet of which ends in the storage reservoir. A cross-section in the hydraulic line is smaller between the hydraulic branch and the working chamber than between the closing valve and the wheel brake cylinders of the pair of wheel brake cylinders.

3 Claims, 2 Drawing Sheets

HYDRAULIC BRAKE SYSTEM FOR AUTOMOTIVE VEHICLES WITH ANTI-SKID CONTROL SYSTEM

BACKGROUND OF THE INVENTION

1. Field of the Invention

This invention relates to a multi-circuit hydraulic brake system for automotive vehicles with an anti-skid control system.

2. Description of the Relevant Art

In brake systems of this type, as well as in accordance with German Published Patent Application DE-OS No. P 37 05 311, a separating valve is connected between the master cylinder and the wheel brake cylinder. According to prior art, the following sequence of operation will result during brake slip control: upon pump starting, the separating valve will be closed and the control valve connected between the wheel brake cylinder and storage reservoir will be opened. As such, pressure medium will escape from the wheel brake cylinder resulting in a decrease in braking force. If the braking pressure is re-increased, the control valve will be closed and the separating valve will be opened. The pressure built up by the pump can be metered into the brake circuit by means of a pressure relief valve. The level of pressure buildup by the pump is adjustable by means of a pressure control valve connected between the pump outlet and the storage reservoir. Up to now, the actuation of the pressure control valve was effected in dependence upon the pressure in the master brake cylinder.

A disadvantage of brake systems of this type is the complicated and voluminous structure and the probability of trouble proportional to the number of individual components; any one of which may cause a failure. The effort and expense of assembly and quality control, plus the system's final price are correspondingly high.

It is an object of this invention to increase the ratio of operational reliability in respect to the number of components which up to now have been considered optimal and to reduce the constructional expenditure of the brake system.

SUMMARY OF THE INVENTION

In accordance with the present invention, a multicircuit hydraulic brake system for automotive vehicles with an anti-skid control system comprise a master brake cylinder having a master piston and working chamber, wheel brake cylinders, a storage reservoir, control valves, and a hydraulic pump actuatable via an electronic boostoer-and-control unit, the outlet of which feeds into a hydraulic line system via a non-return valve. The hydraulic line system couples the above elements and also connects the inlet of the pump with the storage reservoir. The hydraulic line is free from hydraulic closing means between the master brake cylinder and the wheel brake cylinder. Upstream of the non-return valve, there is a hydraulic communication between the outlet of the hydraulic pump and an inlet of a pressure control valve which is actuatable in relation to the volume of the working chamber of the master cylinder. The outlet of the pressure control valve is passed into the storage reservoir by providing a hydraulic branch between the master brake cylinder and the wheel brake cylinders, which branch leads to the inlet of an outlet control valve; the outlet of which ends in the storage reservoir. An orifice is placed in the hydraulic line which has a cross-section smaller, between the hydraulic branch and the working chamber, than between the closing valve and the wheel brake cylinders of the pair of wheel brake cylinders.

An advantageous solution results in that the smaller cross-section in the line between the hydraulic branch and the working chamber is smaller than the nominal diameter of the valve which is controlled so as to open and to close.

A further advantage is shown in that the brake system is doubled, with the master brake cylinder being a tandem cylinder and the motor and the pressure control valve being provided once. In this embodiment, the motor is coupled with a second hydraulic pump and in the second working chamber a central valve is arranged which opens in dependence on the piston stroke and in that the hydraulic communication to the storage reservoir is open in a defined open position of the central valve. An essential advantage of this invention is that at least one check valve per brake circuit is not required.

In the following, this invention will be explained with reference to the drawings and to the specifications.

DESCRIPTION OF THE PREFERRED EMBODIMENTS

Figure 1:
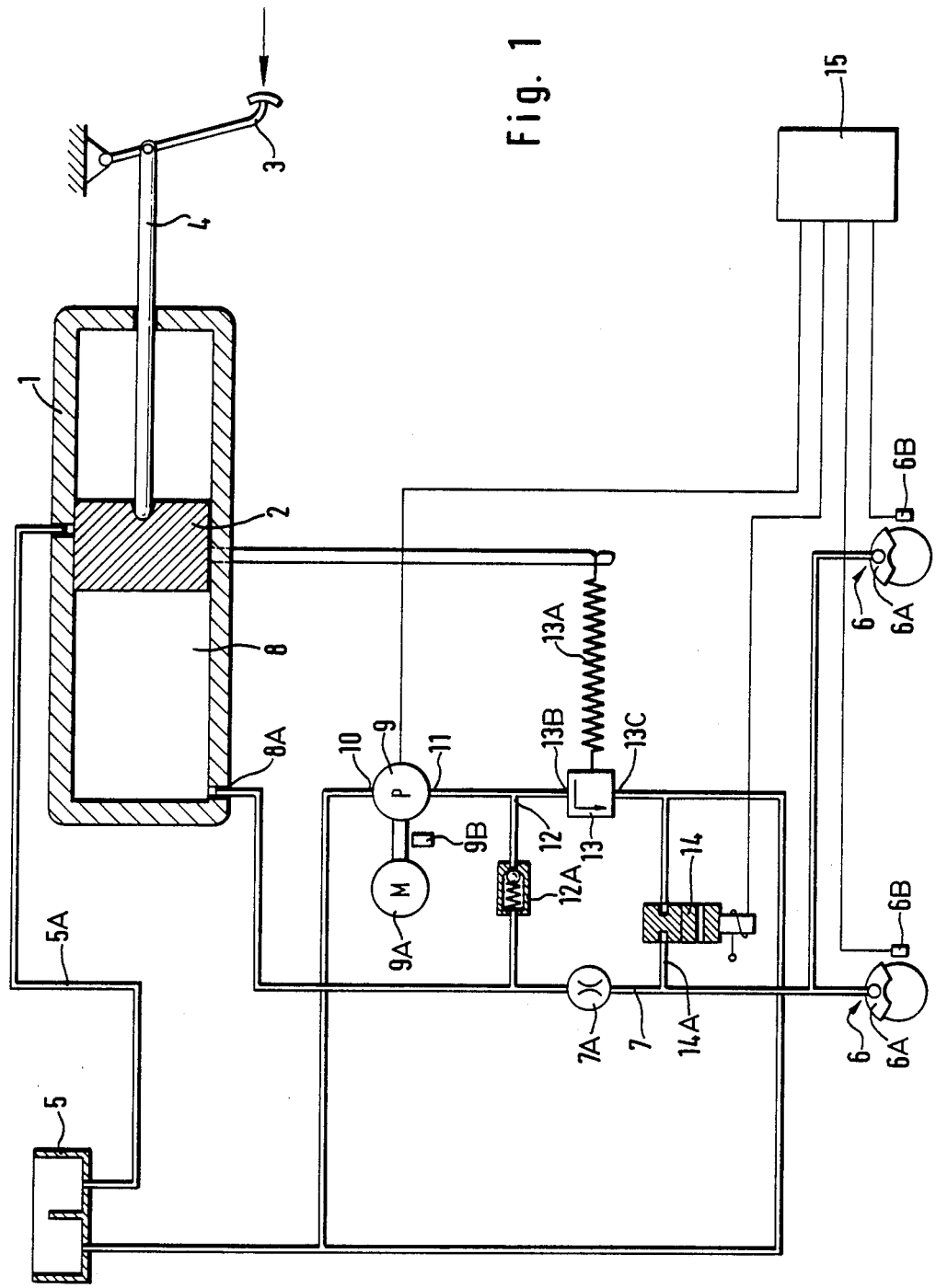
FIG. 1 is a schematic view of a single circuit brake system embodying the present invention.

According to FIG. 1, a master piston 2 is arranged for axial displacement in a master brake cylinder 1. A brake pedal 3 is mechanically coupled with the master piston 2 via a pressure-transmitting means 4. A storage reservoir 5, for retaining a pressure medium, is connected with the master brake cylinder 1 via a hydraulic line 5A. A pair of wheel brake cylinders 6 of one brake circuit is connected with the outlet 8A of a working chamber 8 via a hydraulic line 7. Via the hydraulic line 5A, working chamber 8 can be supplied with pressure medium. By means of the master piston 2, it is possible to generate a working pressure in the working chamber 8 for the actuation of the wheel brake cylinders 6. A pump 9 having driving motor 9A hydraulically communicates with storage reservoir 5 by means of an inlet 10 and an outlet 11. Additionally, outlet 11 of pump 9 is connected to hydraulic line 7 via a hydraulic branch 12 and a non-return valve 12A. Also connected to pump outlet 11 downstream of branch 12, is a pressure control valve 13, having an inlet 13B and an outlet 13C, which hydraulically communicates with storage reservoir 5 and which is mechanically coupled with master piston 2 via two-stage compression spring 13A. Further, an electromagnetic valve 14 ("SG" valve), which will be closed when it is not activated by an electrical current, is coupled with the hydraulic line 7 and the storage reservoir 5 via a hydraulic branch 14A. An orifice 7A is arranged in the hydraulic line 7 between the hydraulic branch 14A and the hydraulic branch 12.

The following sequences of operation determine the mode of operation of the described system.

In accordance with FIG. 1, upon actuation of the brake pedal 3, the master piston 2 will be moved in the direction of the arrow; the working chamber 8 being reduced in size. Via the outlet 8A of the working chamber 8, the pressure medium will be pressed into the pair of wheel brake cylinders 6, thereby initiating a braking action. As a wheel is threatened by lock-up, as determined by a sensor 6B on each respective wheel, the motor 9A will be started and the delivery action of the pump 9 will commence. Simultaneously, controlled by a booster 15, the valve 14 will open in a pulsed manner so that the pressure at the wheel brake cylinders 6 will be reduced by allowing the pressure medium to flow off upstream of the pair of wheel brake cylinders 6. As such, the braking action will decrease until the lock-up danger is over. Subsequently, the valve 14 will close and the braking action can be continued. Due to the pressure medium loss between the working chamber 8 and the pair of wheel brake cylinders 6, the master piston 2 will be in a more advanced position, in the actuating direction, than in case of the same braking action before the onset of anti-skid control. Should anti-skid control resume with piston 2 in this position, the two-stage compression spring 13A of the pressure control valve 13 will lock the pressure control valve 13 thereby increasing pressure beyond proportion at the pump outlet 11. As a result, the pressure will increase between orifice 7A and working chamber 8 so that the master piston 2 will be placed into a safety position, thus ensuring a minimum amount of pressure medium in the working chamber 8.

In this case, a pressure differential will result at orifice 7A due to the reduction of pressure medium from the wheel brake cylinders 6 via the valve 14, upon actuation of anti-skid control, to conform with the road conditions.

If during anti-skid control only the first stage of the compression spring 13A of pressure control valve 13 is stressed, the major portion of the pump's volumetric delivery will flow back into the storage reservoir 5, with a smaller portion entering the brake circuit via the non-return valve 12A. The pressure difference at orifice 7A, in this instance, will be small. In this case, the pressure between orifice 7A and the wheel brake cylinders 6 will also be decreased in a pulsed manner via the valve 14.

Figure 2:
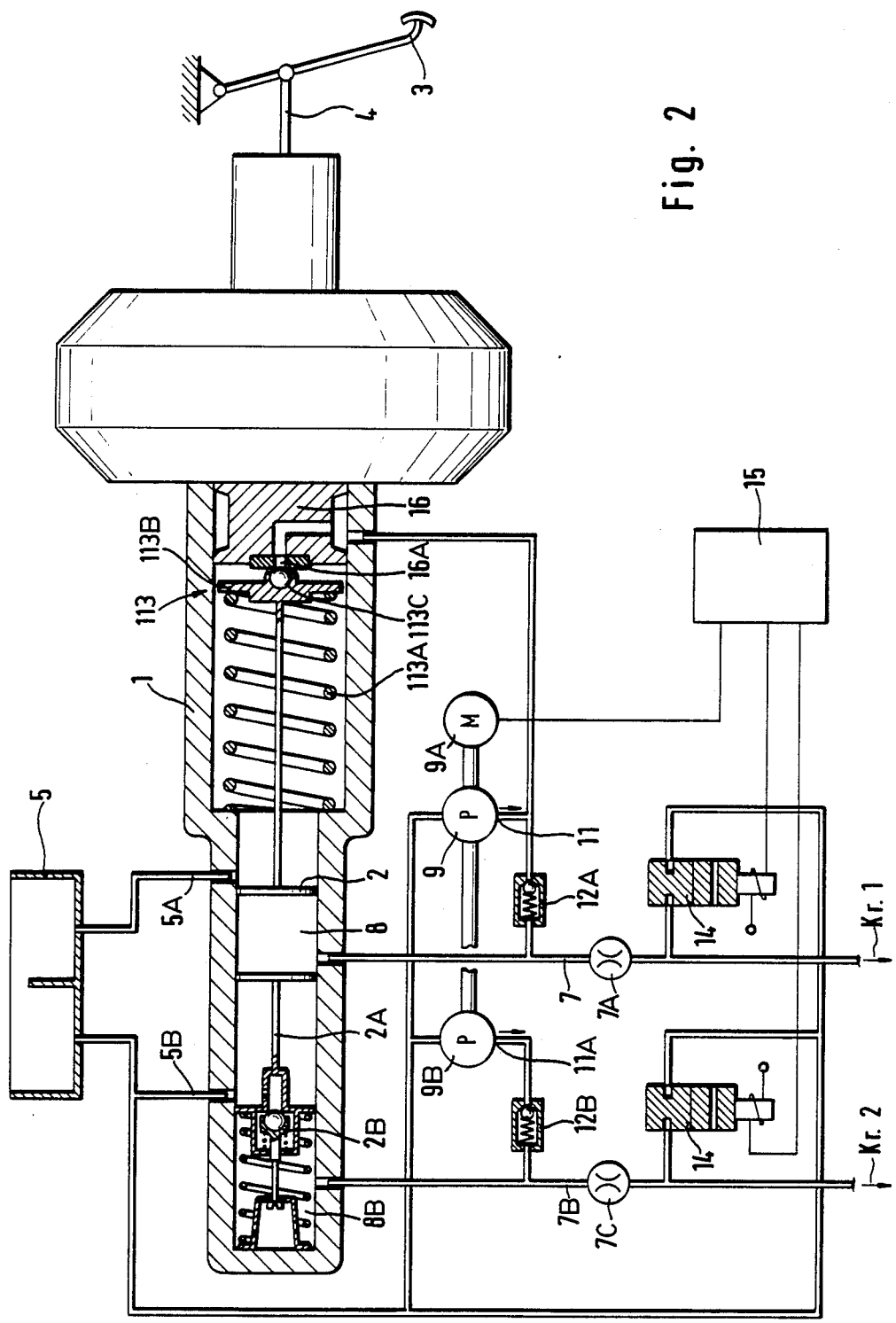
FIG. 2 is a schematic view of a double circuit brake system embodying the present invention.

The control path for pressure control valve 13 can be dimensioned so small as to ensure that pulsation will make itself felt only slightly at the brake pedal. According to FIG. 2, the arrangement described above is doubled. A tandem master brake cylinder is provided having a second pump-and-valve arrangement, associated with the second working chamber 8B, for supplying a second brake circuit Kr. 2. Instead of the external pressure control valve 13, as shown in FIG. 1, the pressure control valve 113 is installed in the master brake cylinder 1, see FIG. 2, and comprises spring 113A, holding member 13B, ball 13C and intermediate piston 16. The closing force of valve 113 may be greater or smaller depending on the position of master piston 2 so that the flow of pressure medium through central bore 16A, of intermediate piston 16, to the storage reservoir 5 is either blocked or free. With the flow of pressure medium through the intermediate piston 16 being blocked, the pressure medium will flow into line 7 and working chamber 8 via the nonreturn valve 12A, with the master piston 2 being reset contrary to the actuating direction. At a predetermined position of the master piston 2, the spring of the internal pressure control valve 113 is relieved to such an extent that the ball 113C will release the central bore 16A allowing the pressure medium to flow into the storage reservoir 5 via hydraulic line 5A. A second pump 9B is coupled with the motor 9A which drives the first pump 9. The pump outlet 11A of pump 9B is connected with the second hydraulic line 7B and the second working chamber 8B via the second non-return valve 12B. An adjustable piston-stroke-dependent central valve 2B, associated with the second master piston 2A, acts as a volume control valve, keeping the volume in the second working chamber 8B to a predetermined minimum volume as in working chamber 8. The central valve 2B consists of a ball, a holding member, a compression spring, and a holding member abutment. In a position of the piston 2A, determined by the dimensions of the enumerated valve components, the holding member will have reached its end position in the holding member abutment when the volume of the working chamber 8B is the greatest. The closing action of the ball at the central bore of the piston 2A will diminish so that the pressure medium volume supplied by pump 9B will flow into the storage reservoir 5 via the central bore and the hydraulic line 5B. In this way, there is a synchronous control of the two working chambers 8, 8B, both in terms of the pressure and volume. The example of the embodiment shown in FIG. 2 has a simpler design and is less prone to troubles, being independent of servomechanisms to be coupled to the master pistons 2, 2A from the outside.

While the preferred embodiments of the invention have been described in detail above, in relation to hydraulic brake systems for automotive vehicles with anti-skid control systems, it would be apparent to those skilled in the art, that the disclosed embodiment may be modified. Therefore, the foregoing description is to be considered exemplary rather than limiting and the true scope of the invention is that described in the following claim.

What is claimed is:

1. A hydraulic brake system for automotive vehicles with an anti-skid control system, having a master brake cylinder with a master piston and a working chamber disposed therein, a first conduit, a wheel brake cylinder connected to said master brake cylinder through said first conduit, a pressure medium storage reservoir connected to said first conduit, control valves connected between said first conduit and said reservoir, a hydraulic pump, operable through a motor, actuable via an electronic booster-and-control unit, the outlet of which is coupled via a non-return valve to said first conduit and the inlet of which is coupled to said reservoir, wherein the improvement comprises:

said first conduit being open between said master brake cylinder and said wheel brake cylinder;

a pressure control valve actuable in response to the volume of said working chamber;

the inlet of said non-return valve communicating with the outlet of said hydraulic pump and the inlet of said pressure control valve;

means communicating the outlet of said pressure control valve with said pressure medium storage reservoir;

a valve in communication with said first conduit between said master brake cylinder and said wheel brake cylinder and controlled via said electronic booster-and-control unit to open and close to bring said first conduit into communication with said pressure medium storage reservoir; and a section of reduced cross-sectional area in said first conduit between said valve and said working chamber, said cross section being smaller than the cross section of said first conduit between said valve and said wheel brake cylinder.

2. The hydraulic brake system defined in claim 1 wherein said valve on a circular passageway and said section of reduced cross-sectional area is smaller than the nominal diameter of said valve passageway.

3. The hydraulic brake system defined in claim 1 wherein said system is doubled, said master brake cylinder comprising a tandem master brake cylinder having a primary piston and a secondary piston disposed in working chambers therein, a central pressure control valve disposed in said secondary piston arranged to open in dependence on the stroke of said second piston, and a second hydraulic pump coupled to said motor;

wherein hydraulic communication with said storage reservoir is open in a defined open position of said central pressure control valve.

* * * * *